US012712808B2

(12) United States Patent
Chandra et al.

(10) Patent No.: US 12,712,808 B2
(45) Date of Patent: Aug. 18, 2026

(54) SYSTEM AND METHOD FOR NETWORK EVENT DATA STREAMING AND PROCESSING VIA MODULAR NETWORK EVENT DATA ARCHITECTURE

(71) Applicant: BANK OF AMERICA CORPORATION, Charlotte, NC (US)

(72) Inventors: Yohan Chandra, McKinney, TX (US); Mandar G. Sukhatankar, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 168 days.

(21) Appl. No.: 18/663,695

(22) Filed: May 14, 2024

(65) Prior Publication Data

US 2025/0358222 A1 Nov. 20, 2025

(51) Int. Cl.

*G06F 15/16* (2006.01)
*H04L 45/00* (2022.01)
*H04L 45/24* (2022.01)
*H04L 45/42* (2022.01)

(52) U.S. Cl.

CPC .............. *H04L 45/42* (2013.01); *H04L 45/24* (2013.01); *H04L 45/566* (2013.01)

(58) Field of Classification Search

CPC ......... H04L 45/42; H04L 45/52; H04L 45/24; H04L 45/566; H04L 41/142

See application file for complete search history.

(56) References Cited

U.S. PATENT DOCUMENTS 6,598,033 B2 7/2003 Ross
9,401,839 B2 7/2016 Kidwell
11,283,822 B2 3/2022 Gervais
11,509,675 B2 11/2022 Srivastav
11,595,429 B2 2/2023 Drummond
11,727,143 B2 8/2023 Ackerman
11,792,214 B1 10/2023 Salmon
2010/0125584 A1* 5/2010 Navas .............. G06F 16/24568 707/747
2013/0254150 A1* 9/2013 Harrison .............. H04L 65/765 706/46
2021/0185079 A1 6/2021 Drummond
2022/0303188 A1* 9/2022 Wilson .................... H04L 41/06
2023/0041541 A1 2/2023 Petersen
2023/0111864 A1 4/2023 Thomas
2023/0113621 A1 4/2023 Griffin
2023/0283541 A1* 9/2023 Jiang .................. H04L 41/0654

(Continued)

*Primary Examiner* — Yves Dalencourt

(74) *Attorney, Agent, or Firm* — Moore & Van Allen PLLC; Nicholas C. Russell

(57) ABSTRACT

Systems, computer program products, and methods are described herein for network event data streaming and processing via modular network event data architecture. The present disclosure includes receiving a plurality of network event data in real-time, determining a feature of at least one network event data, labeling the at least one network event data with a label corresponding with the feature, retrieving a preconfigured routing path, routing, from the input module to a first processing module, the at least one network event data, wherein the first processing module is reusable for other preconfigured routing paths, and transforming the network event data in accordance with the predetermined rule.

15 Claims, 5 Drawing Sheets

(56) References Cited

U.S. PATENT DOCUMENTS

| | | | |
|---|---|---|---|
| 2023/0353584 | A1 | 11/2023 | Liu |
| 2023/0421581 | A1 | 12/2023 | Dos Santos |
| 2024/0171594 | A1 | 5/2024 | Garcia |
| 2024/0171595 | A1 | 5/2024 | Salmon |

* cited by examiner

SYSTEM AND METHOD FOR NETWORK EVENT DATA STREAMING AND PROCESSING VIA MODULAR NETWORK EVENT DATA ARCHITECTURE

TECHNOLOGICAL FIELD

Example implementations of the present disclosure relate to a system and method for network event data streaming and processing via modular network event data architecture.

BACKGROUND

Stream processing involves real-time or near-real-time data processing as data flows from one point to another, utilizing languages, libraries, and systems. Typically, stream processing requires building end-to-end processes known as stream jobs, which handle data from input to output, incorporating processing logic along the way. However, as applications develop, redundant patterns emerge between different stream jobs, leading to the duplication of tasks and resources across the system. This repetition not only increases computational overhead but also impedes scalability and maintenance efforts.

BRIEF SUMMARY

Systems, methods, and computer program products are provided for network event data streaming and processing via modular network event data architecture.

In one aspect, a system for network event data streaming and processing via modular network event data architecture is presented. The system includes a processing device, a non-transitory storage device containing instructions when executed by the processing device, causes the processing device to perform the steps of receiving at least one data stream at an input module, a data stream of the at least one data stream comprising a plurality of network event data in real-time, determining, at the input module, a feature of at least one network event data of the plurality of network event data, labeling, at the input module, the at least one network event data with a label corresponding with the feature, retrieving, at the input module, a preconfigured routing path corresponding to the label from a path database, routing, from the input module to a first processing module of a plurality of processing modules determined by the preconfigured routing path, the at least one network event data, wherein the first processing module comprises a microservice engine to implement a predetermined rule based on corresponding rule data from a rules data database, and wherein the first processing module is reusable for other preconfigured routing paths, transforming the network event data in accordance with the predetermined rule, and routing, from a final processing module of the plurality of processing modules to an output module, as determined by the preconfigured routing path.

In some implementations, the preconfigured routing path arranges the plurality of processing modules in series with one another such that a module output from the first processing module provides a module input to a second processing module.

In some implementations, receiving at least one data stream at an input module comprises receiving at least one data stream of a first type and converting from the first type to a second type, and wherein each of the plurality of processing modules is compatible with the second type.

In some implementations, upon a condition where the at least one network event data is labeled as a priority event with a priority label corresponding with the feature, the first processing module transforms the priority event prior to transforming network event data of other data streams.

In some implementations, the predetermined rule is selected from the group consisting of an insertion rule, a correlating rule, and enriching rule, a transformation rule, a reconciliation rule, and an API rule.

In some implementations, the corresponding rule data from the rules data database is amendable, and wherein upon a condition where the corresponding rule data is amended, any subsequent implementing of the corresponding rule data by the microservice engine implements the amended corresponding rule data.

In some implementations, upon a condition when transforming the network event data in accordance with the predetermined rule in unsuccessful, the network event data is rerouted through the first processing module a predetermined number of times.

In another aspect, a computer program product for network event data streaming and processing via modular network event data architecture is presented. The computer program product includes a non-transitory computer-readable medium including code causing an apparatus to receive at least one data stream at an input module, a data stream of the at least one data stream comprising a plurality of network event data in real-time, determine, at the input module, a feature of at least one network event data of the plurality of network event data, label, at the input module, the at least one network event data with a label corresponding with the feature, retrieve, at the input module, a preconfigured routing path corresponding to the label from a path database, route, from the input module to a first processing module of a plurality of processing modules determined by the preconfigured routing path, the at least one network event data, wherein the first processing module comprises a microservice engine to implement a predetermined rule based on corresponding rule data from a rules data database, and wherein the first processing module is reusable for other preconfigured routing paths, transform the network event data in accordance with the predetermined rule, and route, from a final processing module of the plurality of processing modules to an output module, as determined by the preconfigured routing path.

In some implementations, the preconfigured routing path arranges the plurality of processing modules in series with one another such that a module output from the first processing module provides a module input to a second processing module.

In some implementations, receiving at least one data stream at an input module comprises receiving at least one data stream of a first type and converting from the first type to a second type, and wherein each of the plurality of processing modules is compatible with the second type.

In some implementations, upon a condition where the at least one network event data is labeled as a priority event with a priority label corresponding with the feature, the first processing module transforms the priority event prior to transforming network event data of other data streams.

In some implementations, the predetermined rule is selected from the group consisting of an insertion rule, a correlating rule, and enriching rule, a transformation rule, a reconciliation rule, and an API rule.

In some implementations, the corresponding rule data from the rules data database is amendable, and wherein upon a condition where the corresponding rule data is amended, any subsequent implementing of the corresponding rule data by the microservice engine implements the amended corresponding rule data.

In some implementations, upon a condition when transforming the network event data in accordance with the predetermined rule in unsuccessful, the network event data is rerouted through the first processing module a predetermined number of times.

In yet another aspect, a method for network event data streaming and processing via modular network event data architecture is presented. The method includes receiving at least one data stream at an input module, a data stream of the at least one data stream comprising a plurality of network event data in real-time, determining, at the input module, a feature of at least one network event data of the plurality of network event data, labeling, at the input module, the at least one network event data with a label corresponding with the feature, retrieving, at the input module, a preconfigured routing path corresponding to the label from a path database, routing, from the input module to a first processing module of a plurality of processing modules determined by the preconfigured routing path, the at least one network event data, wherein the first processing module comprises a microservice engine to implement a predetermined rule based on corresponding rule data from a rules data database, and wherein the first processing module is reusable for other preconfigured routing paths, transforming the network event data in accordance with the predetermined rule, and routing, from a final processing module of the plurality of processing modules to an output module, as determined by the preconfigured routing path.

In some implementations, the preconfigured routing path arranges the plurality of processing modules in series with one another such that a module output from the first processing module provides a module input to a second processing module.

In some implementations, receiving at least one data stream at an input module comprises receiving at least one data stream of a first type and converting from the first type to a second type, and wherein each of the plurality of processing modules is compatible with the second type.

In some implementations, upon a condition where the at least one network event data is labeled as a priority event with a priority label corresponding with the feature, the first processing module transforms the priority event prior to transforming network event data of other data streams.

In some implementations, the predetermined rule is selected from the group consisting of an insertion rule, a correlating rule, and enriching rule, a transformation rule, a reconciliation rule, and an API rule.

In some implementations, the corresponding rule data from the rules data database is amendable, and wherein upon a condition where the corresponding rule data is amended, any subsequent implementing of the corresponding rule data by the microservice engine implements the amended corresponding rule data.

In some implementations, upon a condition when transforming the network event data in accordance with the predetermined rule in unsuccessful, the network event data is rerouted through the first processing module a predetermined number of times.

The above summary is provided merely for purposes of summarizing some example implementations to provide a basic understanding of some aspects of the present disclosure. Accordingly, it will be appreciated that the above-described implementations are merely examples and should not be construed to narrow the scope or spirit of the disclosure in any way. It will be appreciated that the scope of the present disclosure encompasses many potential implementations in addition to those here summarized, some of which will be further described below.

BRIEF DESCRIPTION OF THE DRAWINGS

Having thus described implementations of the disclosure in general terms, reference will now be made the accompanying drawings. The components illustrated in the Figures may or may not be present in certain implementations described herein. Some implementations may include fewer (or more) components than those shown in the Figures.

Figure 1A:
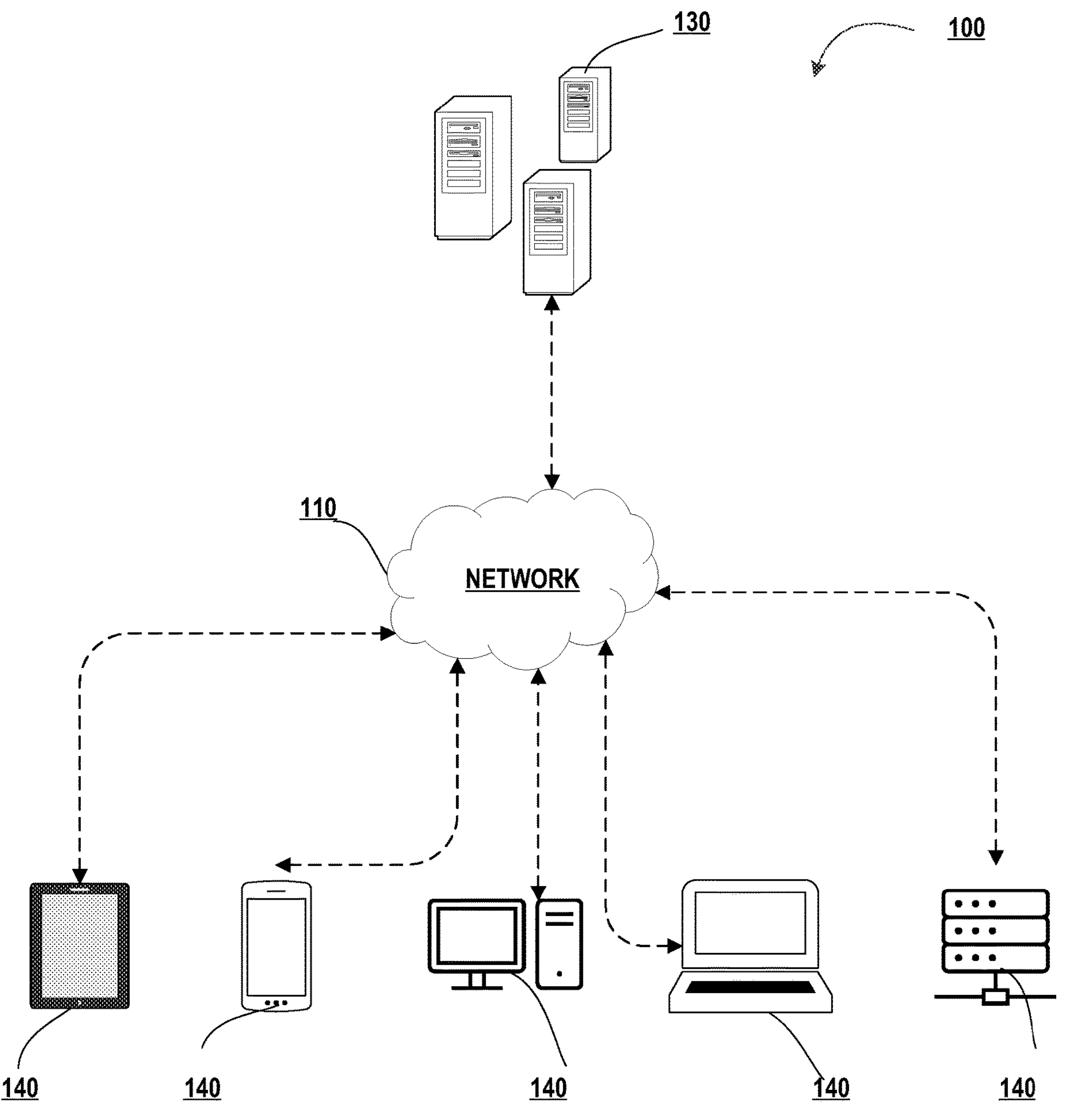
Figure 1B:
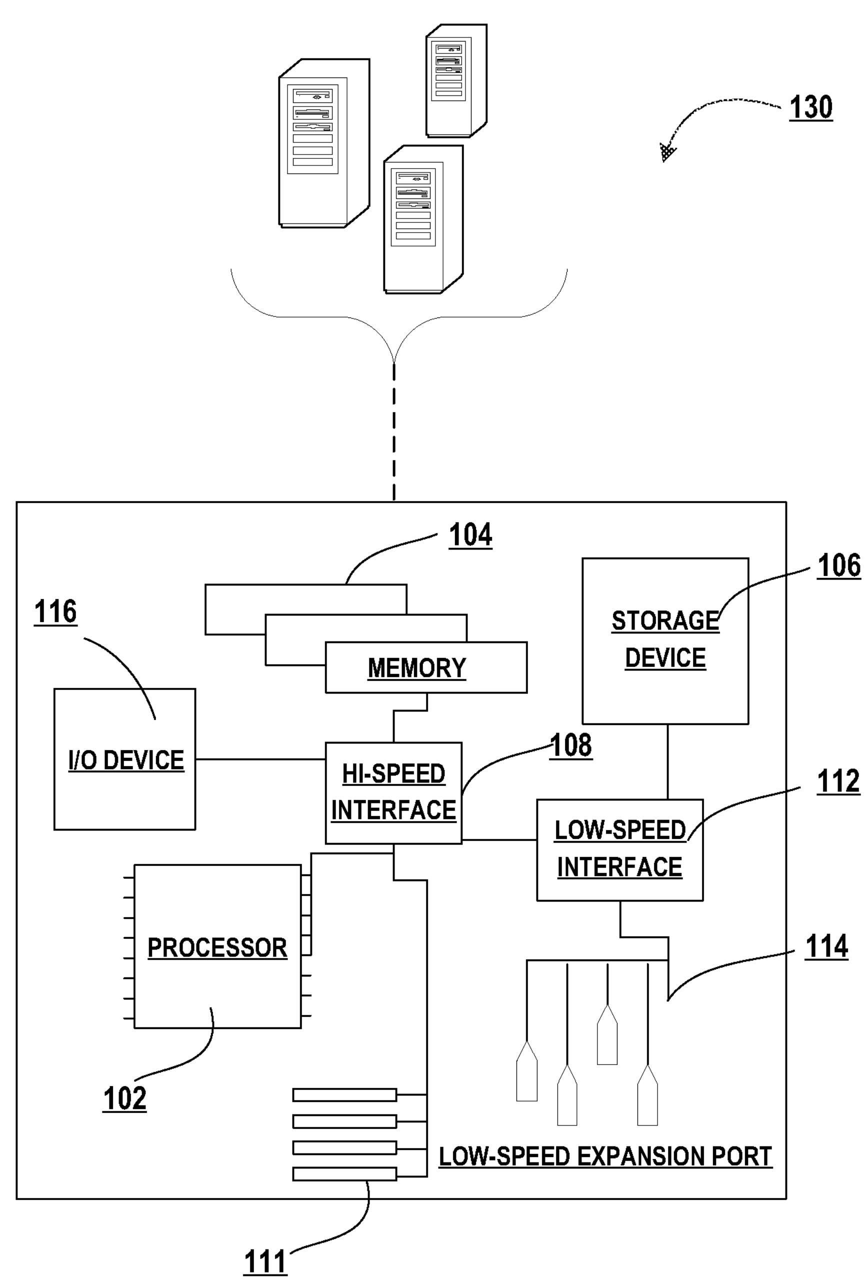
Figure 1C:
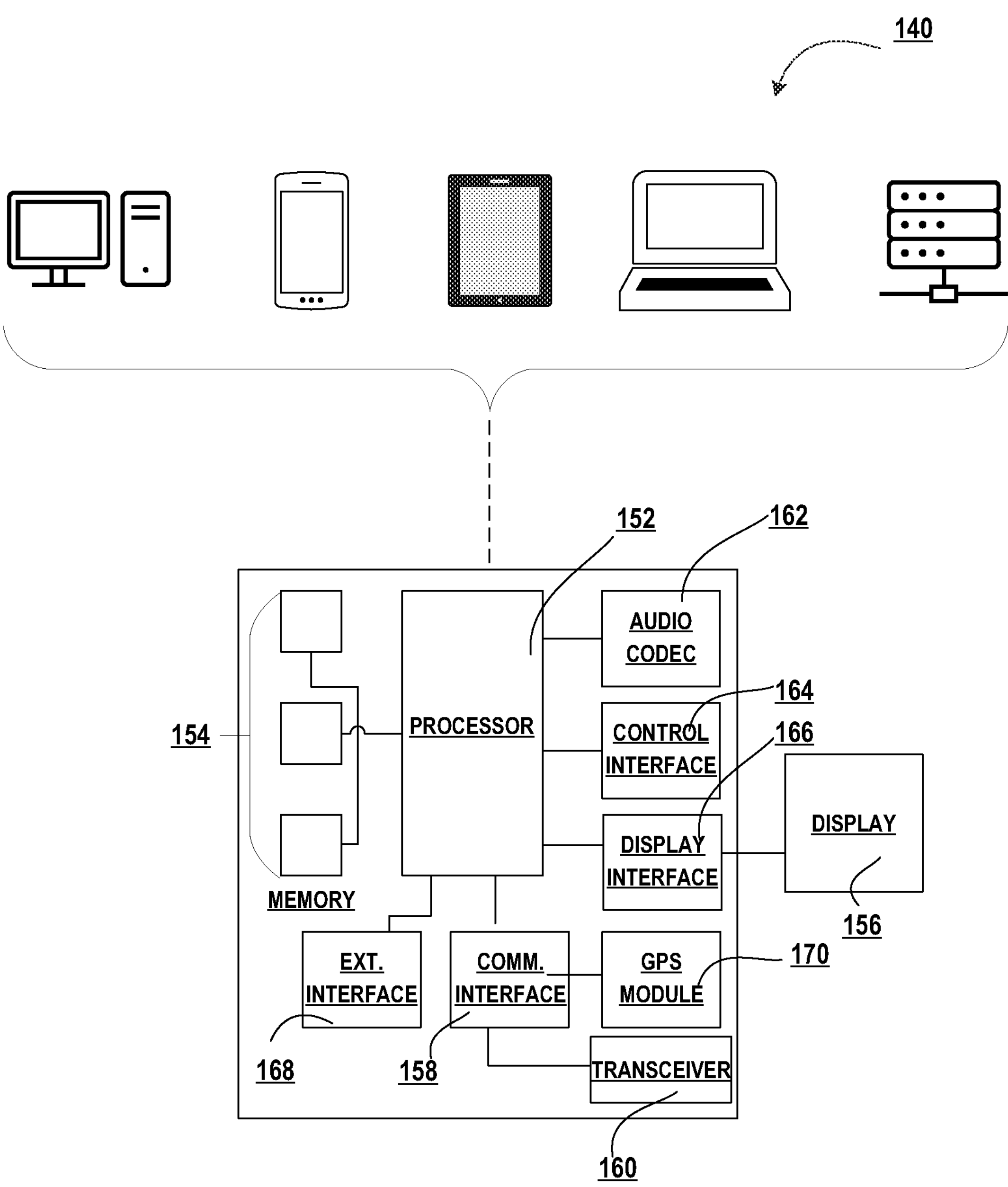
Figure 2:
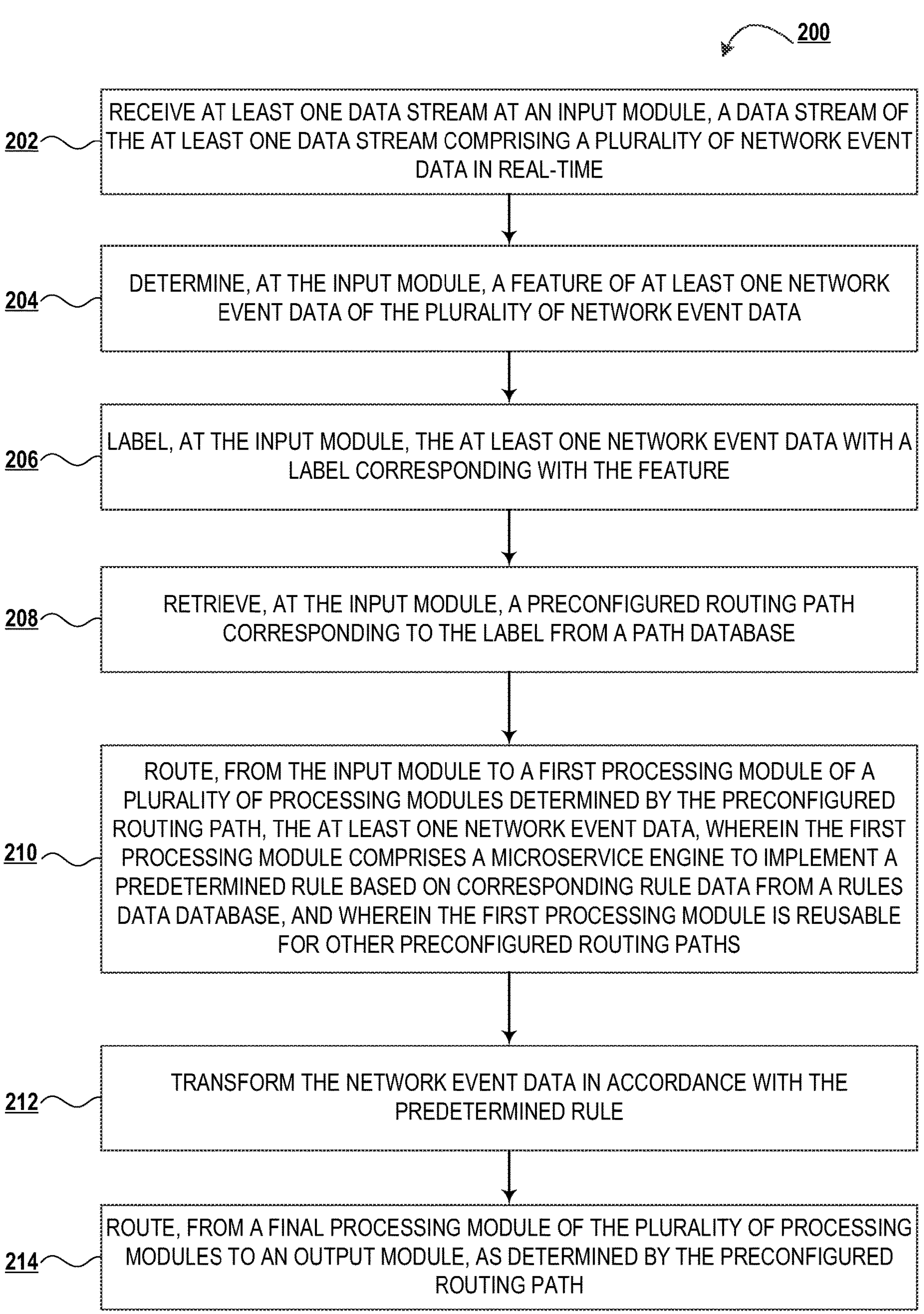
Figure 3:
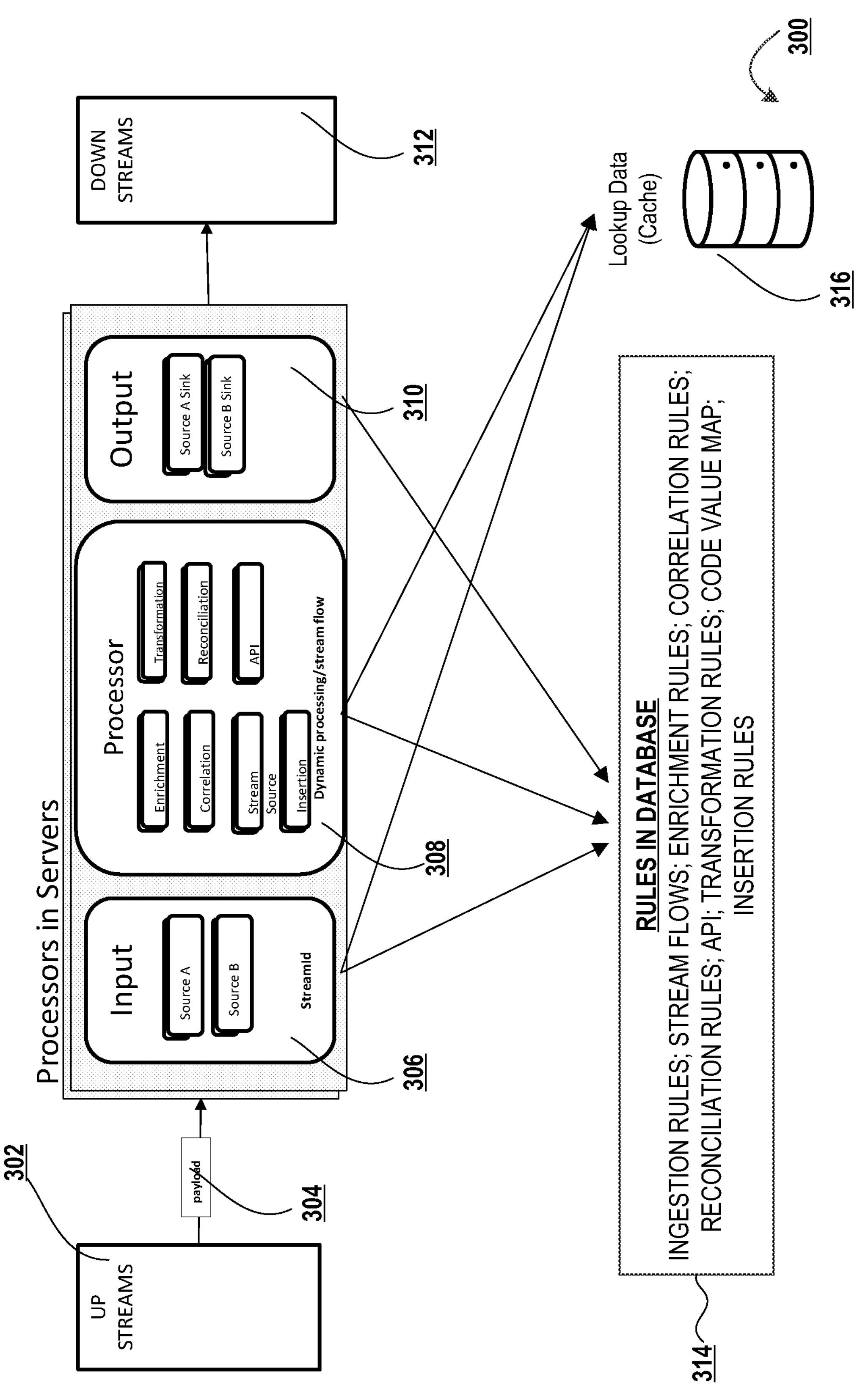

FIGS. 1A-1C illustrates technical components of an exemplary distributed computing environment for network event data streaming and processing via modular network event data architecture, in accordance with an implementation of the disclosure;

FIG. 2 illustrates a process flow for network event data streaming and processing via modular network event data architecture, in accordance with an implementation of the disclosure; and FIG. 3 illustrates a graphical architectural representation of network event data streaming and processing via modular network event data architecture, in accordance with an implementation of the disclosure.

DETAILED DESCRIPTION

Implementations of the present disclosure will now be described more fully hereinafter with reference to the accompanying drawings, in which some, but not all, implementations of the disclosure are shown. Indeed, the disclosure may be embodied in many different forms and should not be construed as limited to the implementations set forth herein; rather, these implementations are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "module" in the context of "input module," "processing module," and "output module" may refer to a software component where each module contains a micro-service. In an architectural paradigm, an input module typically handles data ingestion or acquisition, gathering information from external sources or user inputs. The processing module(s) may then operate on this data, executing various algorithms, computations, or transformations as required by the application logic. Finally, the output module may manage the dissemination or storage of the processed data, delivering it to designated destinations such as databases, user interfaces, or other systems.

As used herein, "network event data" or "event data" may refer to the digital records capturing interactions or occurrences within a computer network. This includes but is not limited to logs of network traffic, system activities, and user actions. Network event data typically encompasses information such as timestamps, source and destination IP addresses, port numbers, protocol types, and data payload contents. Moreover, it may include metadata associated with network events, such as the device or application generating the event and the severity or classification of the event. The scope of network event data can extend to encompass a wide array of network-related activities, from routine data transfers to security incidents and anomalies.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some implementations, the user may be an individual having past relationships, current relationships or potential future relationships with an entity. In some implementations, the user may be an employee (e.g., an associate, a project manager, an IT specialist, a manager, an administrator, an internal operations analyst, or the like) of the entity or enterprises affiliated with the entity.

As used herein, a "user interface" or "display" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a element matches a predetermined criterion, including that a threshold has been met, passed, exceeded, and so on.

The technical problem lies in the redundant patterns in stream jobs within the stream processing framework that result from the evolution of applications, leading to an increase in duplicated tasks and resource utilization. This duplication not only amplifies computational overhead but also poses significant challenges to scalability and maintenance. Moreover, the proliferation of redundant patterns across various stream jobs complicates system management, making it arduous to identify and rectify inefficiencies effectively. As a consequence, the system's capacity to handle real-time or near-real-time data processing is compromised, jeopardizing its ability to meet performance requirements under dynamic workloads. Additionally, the increasing complexity stemming from redundant patterns makes it increasingly difficult for developers to navigate and optimize stream processing pipelines, impeding innovation and hindering the adoption of new technologies. Ultimately, addressing the issue of redundant patterns is imperative to streamline stream processing operations, enhance system efficiency, and facilitate the seamless handling of data flows in real-time environments.

Existing solutions to the issue of redundant patterns in stream processing often involve manual identification and elimination of duplicated tasks and resources, or the implementation of custom code to consolidate common functionalities. However, these approaches are labor-intensive and error-prone, relying heavily on human intervention and subjectivity. Automated solutions, such as pattern recognition algorithms or stream processing frameworks with built-in optimization features, offer some relief but are often limited in their ability to adapt to evolving application requirements and patterns. Additionally, these solutions may introduce additional complexity and overhead to the system, further exacerbating the problem they intend to solve.

Addressing these challenges necessitates the establishment of a system and method for network event data streaming and processing via modular network event data architecture. Such a framework allows for the generation and re-use of processing modules to govern the flow of network event data, which thereby allows for quick combining of modules through a user interface without the need to write computer code for each processing step for every new job (i.e., flow). Furthermore, such a framework allows for the building of a complete pipeline with scalable processing modules. The functionality and rules underlying these processing modules may further be changed in a rules database and subsequently rolled out and implemented to existing network event data flow without disruption.

To do so, a data stream of network events (network event data) is received at an input module. Network events may be a result of interaction with elements. Network event data may be converted to a different format (from XML, AVRO to JSON, or to and from any other type) for consistency.

Based on features of the network event data, the network event data may be tagged. Based on the tag, a routing path database may be queried to retrieve the appropriate routing path. The routing path may consist of instructions for the network event data to undergo a processing sequence via a series of processing modules. Processing modules may be reusable components that can be re-implemented for any new routing path defined. Processing modules may receive and process a stream of network event data in first in, first out ("FIFO") order, or otherwise prioritize certain network events based on the network event tag and corresponding routing path. Each processing module may contain a micro-service engine to implement a predetermined business rule based on data from a rules database. The rules may be modified and refreshed within the processing module in real-time. Examples may include insertion rules, correlating rules, enriching rules, transformation rules, reconciliation rules, and API rules. The network event data may then be transformed (or other disposition) based on the rule. The network event data may then be subjected to subsequent processing modules (based on the routing path) corresponding to other rules (in series). In the event of errors at the processing module, the network event may be re-routed back through the processing module a predetermined number of times or until successful.

What is more, the present disclosure provides a technical solution to a technical problem. As described herein, the technical problem includes the inability to amend rules data and have the changes implemented throughout multiple flow paths of network event data, without having to modify each of the flow paths separately. Moreover, another technical problem exists with the inability to re-use processing modules in a scalable way, or in a way that allows for prioritization of high priority network event data. The present disclosure embraces an improvement over existing data stream tools by processing network event data through a data stream (i) with fewer steps to achieve the solution (e.g., reusing existing processing modules for multiple routing paths), thus reducing the amount of network resources, such as processing resources, storage resources, network resources, and/or the like, that are being used, (ii) providing a more accurate solution to problem, thus reducing the number of resources required to remedy any errors made due to a less accurate solution (e.g., providing for an expedited pathway for high priority network event data, such as to not lose track of high priority network event data), (iii) removing manual input and waste from the implementation of the solution, thus improving speed and efficiency of the process and conserving network resources (e.g., allowing for the re-use of processing modules through a drag-and-drop implementation without the need to program for processing each time a new routing path is generated), (iv) determining an optimal amount of resources that need to be used to implement the solution, thus reducing network traffic and load on existing network resources (e.g., re-routing network event data in the event of an error or bottleneck). Furthermore, the technical solution described herein uses a rigorous, computerized process to perform specific tasks and/or activities that were not previously performed. In specific implementations, the technical solution bypasses a series of steps previously implemented, thus further conserving network resources.

FIGS. 1A-1C illustrate technical components of an exemplary distributed computing environment 100 for network event data streaming and processing via modular network event data architecture, in accordance with an implementation of the disclosure. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an implementation of the distributed computing environment 100, and it will be appreciated that in other implementations one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some implementations, the system 130 and the endpoint device(s) 140 may have a client-server relationship in which the endpoint device(s) 140 are remote devices that request and receive service from a centralized server, i.e., the system 130. In some other implementations, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an implementation of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some implementations, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an implementation of the disclosure. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one implementation includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some implementations, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some implementations, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some implementations, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some implementations, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a graphical representation of network event data streaming and processing via modular network event data architecture, in accordance with an implementation of the disclosure. As shown in FIG. 2, the process may begin at block 202, where the system 130 receives at least one data stream at an input module. A data stream may include a real-time continuous flow of information detailing events like activities and interactions within a network, such as connections, transfers, communications, clicks, pings, or the like.

While some commercially available systems provide the ability to analyze data streams and provide for programming models to build streaming applications, the present system 130 resides on top of such commercially available systems to utilize their underlying functionalities, while making significant improvements to their functionalities and user experiences. By doing so, the present system 130 ultimately provides for more efficient processing, more efficient creation of new processing combinations and sequences (i.e., routing paths), and a more scalable approach to processing. As such, these commercially available systems may provide APIs, libraries, and/or other infrastructure that the present system 130 integrates with.

In some implementations, the input module may receive one data stream, while in other implementations the input module may receive a plurality of data streams from various sources. In either implementation, a data stream may include a plurality of network event data, which is generated as a result of user interaction within the system 130. For example, the entity may maintain a website for accessing account information and/or products and services. Upon a condition where a user (e.g., a customer) interacts with a particular portion of the website (e.g., a hyperlink to a new product or service, an inquiry box, or the like), network event data that documents this interaction is generated and is broadcasted through the network within a data stream.

In some implementations, the network event data may be a synthetic event that is generated as a result of data gathered and analyzed in a separate process. For example, a network system (either a portion of the present disclosure, or a distinct system) may monitor interactive elements of a website, machine, terminal, or the like, and as a result of certain qualifying occurrences, an assumption is made that a user is engaging in an activity deemed valuable by the entity for further processing or to initiate subsequent interactions with the user.

The generation of network event data within a network may involve a plurality of network-connected devices equipped with sensors capable of detecting user actions. These actions may trigger events, such as clicks, taps, or swipes, which are then transmitted over the network within a data stream. The network event data may include information such as the type of action performed, the timestamp, and additional metadata associated with the user or device.

The system 130 receives the at least one data stream at an input module. It shall be appreciated that each data stream may include network event data of varying formats, including XML, JSON, AVRO, or the like. In order to facilitate processing of the network event data in a manner that promotes re-usable code segments, it may be advantageous to covert the network event data from the format of which it is received (i.e., a first type) to a standardized format (i.e., a second type). Examples of this second type include JSON text format or the like, although various other formats are considered. Indeed, as will be appreciated in view of the remainder of this disclosure, the second type of format will be compatible with each of the plurality of processing modules to which the network event data is to be subjected.

In some implementations, the first type of event data format may include a mixture of multiple formats. For example, the incoming data stream at the input module may contain 50% XML network event data, and 50% JSON network event data. In such instances, each network event data may be subjected to examination of its metadata or machine learning algorithms to determine the format, and whether the network event data needs to be converted to another format type, or whether the network event data should be forwarded without conversion.

The process may then continue at block 204, where the system 130 determines, at the input module, a feature of at least one network event data of the plurality of network event data. The input module may extract relevant metadata associated with the network event data, such as timestamps, source identifiers, or contextual information, to infer the type or characteristics of the network event data. In doing so, the input module assists in classification of the network event data for the desired subsequent analysis as will be described with respect to bock 206. Additionally, or alternatively, the input module may use semantic analysis analyze the textual content or semantic context of the network event data to infer event types or attributes based on linguistic patterns or semantic cues.

Next, at block 206, the input module of the system 130 labels the at least one network event data with a label corresponding with the feature. The input module of the system 130 may recognize (i.e., determine the feature) of network event data types including financial transactions, system logs, network traffic patterns, and sensor readings. Within financial transactions, the input module may identify purchases, transfers, sales, nefarious activities, or the like. In recognizing system infrastructure, the input module may identify events such as software errors, security breaches, system failures, or the like. The input module may also monitor for anomalies in network traffic indicative of cyber threats or network congestion.

Based on such feature determination (i.e., stream identification), a corresponding label (i.e., tag) may be applied to the network event data. To determine the appropriate label, lookup data from a database may be used to provide context or information regarding the network event data. This lookup data could include reference tables, historical records, or other structured datasets containing supplementary information. Once a label has been applied or associated with network event data, the labeled network event data may be reintegrated into the data stream for further processing, as will be described herein. In some implementations, the input module may filter out unused network event data from the data stream, such as to only provide subsequent processes with network event data deemed to be valuable. In doing so, the efficient use of network resources is prioritized.

At block 208, the system 130 retrieves, at the input module, a preconfigured routing path corresponding to the label from a path database. A "routing path" dictates the process flow to which the network event data is subjected. Users associated with an entity may predefine routing paths for various types of network event data, each of the predefined routing paths being suited for a predefined label such that the network event data is routed appropriately.

Along each routing path, after the input module has been executed, the network event data is then subjected to a processing module as specified in the routing path. The processing module may be the first of a plurality of processing modules, with each successive processing module receiving, as an input, the output of the preceding processing module. In other words, the preconfigured routing path arranges the plurality of processing modules in series with one another such that a module output from the first processing module provides a module input to a second processing module.

In some implementations, there may only be one processing module for a predetermined routing path. In other implementations, there may be 2, 3, 4, 5, 6, 7, 8, 9, 10, 15, 20, or more processing modules for a predetermined routing path. The first processing module (and by inference, any subsequent processing module) transforms the network event data from the plurality of data streams based on first-in-first-out ("FIFO") logic. In other words, if there is a queue of network event data waiting to be transformed (i.e., processed) at a processing module (be it the first processing module or any other subsequent processing module), the processing module may first transform the network event data that has been waiting in the queue for the longest period of time.

In some implementations, and as will be explained in greater detail herein, network event data with certain predetermined labels may be treated as high-priority, and thus routed to skip the queue and instead be the very next network event data to be processed by a processing module. Alternatively, as will be described herein, these high-priority network event data may be provided with predetermined routing paths conducive to such priorities.

Continuing at block 210, the system 130 routes, from the input module to a first processing module of a plurality of processing modules determined by the preconfigured routing path, the at least one network event data. Each processing module, whether one processing module or a plurality of processing modules, includes a microservice engine to implement a predetermined rule. The predetermined rule, in some implementations, may be associated with a business rule.

Examples of business rules may include, but are not limited to, regulatory compliance rules to ensure adherence to legal requirements set by governing bodies, such as anti-money laundering regulations or financial reporting standards, exposure management rules to mitigate financial exposure through policies on investment diversification, credit assessment, and capital allocation, operational procedures for internal processes, such as transaction processing, account maintenance, and data management, and the like. Other rules may include customer interaction rules to govern customer service protocols, marketing strategies, and product offerings tailored to individual preferences and needs. Business rules in a rules database are typically stored as structured rules data in a standardized format for retrieval and processing by the system 130. These business rules may be organized into logical categories or modules based on their respective domains, such as regulatory compliance, exposure management, or operational procedures. Each rule data may contain attributes, including a unique identifier, description, conditions, actions, and dependencies. Conditions may specify the triggering events or criteria that must be met for the rule to be invoked, while actions may outline the corresponding responses or outcomes. Additionally, dependencies may indicate interdependencies or relationships between rules. As such, the rules are based on corresponding rule data from a rules data database.

In some implementations, a first processing module (e.g., the first module of the chain of processing modules defined by the routing path, or, in other implementations, the sole processing module) may be configured to receive network event data from a single stream (e.g., a stream containing and incoming stream of network event data). In other implementation, the first processing module may be configured to receive network event data from a plurality of data streams, e.g., a plurality of streams, each containing an incoming stream of network event data such that the first processing module may receive multiple network event data simultaneously. In such implementations, as network event data is labeled, as per block 206, certain predetermined labels may lead to the treatment of network event data as "high priority" such that the receipt of a high priority network event data in the queue of a processing module may allow the network event data to skip the queue (e.g., be first in line to be processed at the processing module). In other words, when a high priority network event data is received, the first processing module transforms the priority event prior to transforming other network event data from the plurality of data streams. In other implementations, if the input module recognizes network event data as being high priority, a unique identifier (e.g., label) may be applied to the network event data that will be associated with a routing path specifically developed to accommodate this type of network event data. In doing so, this routing path may utilize processing modules different that, and/or separate from, processing modules that are specified in routing paths for non-high priority network event data. This allows for the dedicating of resources to the high priority network event data in a manner which may result in fewer errors, less processing time, and so forth.

One benefit of the system 130 described herein is that processing modules (for example, the first processing module) are reusable for other preconfigured routing paths. The reusability of these processing modules may be implemented through a computer program interacted with by a user associated with the entity, though a user interface (e.g., display of an endpoint device 140). While numerous business rules may traditionally be implemented into the processing of event stream data, the architecture presented herein allows for the processing of network data stream network event data by the processing modules, which contain pointers to the code representing the business rules in the rules database (i.e., repository). As such, the processing module(s) simply provide for the execution of the stored rules data, with the actual rules data being external. In turn, programming of each routing path that may be required by the entity does not require the coding of rules data each time a new routing path is created. Rather, a user can specify (typically by an alphanumeric identifier, or button) the processing module associated with the type of processing desired, and then move on to the selection of a subsequent processing module or output module.

By doing so, modifications or updates to rules data in the rules database are achieved at a centralized platform for rule management. This rules database allows authorized users to access the database to review, update, or add new rules as needed. A structured format of the rules data may allow for identification and modification of specific rules without affecting others. By editing the attributes of a rule entry, such as conditions, actions, or dependencies, users can modify the behavior and outcomes governed by that rule. Additionally, the database may include version control mechanisms for the tracking of changes over time and version rollback.

The predetermined rule, implemented by the microservice of the processing module, may include an insertion rule, a correlating rule, and enriching rule, a transformation rule, a reconciliation rule, an API rule, and so forth.

An insertion rule may refer a type of rule data that governs the addition of new data records into a database. It specifies the criteria and conditions under which new data can be inserted, along with any associated actions or validations required. Insertion rules provide consistency of the database by enforcing constraints on the data being added, such as data type validation, referential integrity checks, logical validations, or the like.

A correlating rule may refer a type of rule data that defines the relationship or correlation between different data elements or attributes within a database. The correlating rule may specify conditions or criteria under which certain data values or attributes are expected to be related or correlated in a specific manner. Correlating rules identify and enforce dependencies between related data elements. As one non-limiting example, a correlating rule may specify that the billing address of a customer must match the address associated with their payment method.

An enriching rule may refer to a type of rule data that augments existing data within a database by incorporating additional information or attributes from external sources. These rules enrich the data by supplementing it with contextual details. As one non-limiting example, an enriching rule may automatically retrieve and append market data, such as stock prices or exchange rates, to existing transaction records. Such additional information improves the analytical value of the database.

A transformation rule may refer to a type of rule data that specifies how data should be converted or manipulated within a database to achieve a desired outcome or format. These rules define the actions or operations to be applied to input data to produce transformed output data. Transformation rules may include tasks such as data cleansing, normalization, aggregation, or calculation. As one non-limiting example, a transformation rule may dictate the conversion of raw transactional data into standardized formats for reporting purposes, or it may define mathematical operations to compute derived metrics such as profit margins or growth rates.

A reconciliation rule may refer to a type of rule data that provides accuracy between different sets of data within a database or between multiple databases. These reconciliation rules detect and resolve discrepancies or inconsistencies that may arise due to data entry errors, system failures, or process inefficiencies. As one non-limiting example, reconciliation rules may be used to compare financial transactions recorded in different systems, such as accounting and banking systems, and to reconcile differences between them. This process involves identifying mismatches, investigating the root causes, and taking corrective actions to bring the data into alignment.

An API rule may refer to a guideline or protocol that governs the interaction and usage of Application Programming Interfaces (APIs) within the system or the system and an external system. API rules define the standards for accessing and integrating APIs securely, and may include authentication mechanisms, data formats, error handling, rate limiting, and versioning. As one non-limiting example, API rules ensure that APIs used for accessing financial data or services adhere to industry standards and comply with regulatory requirements, such as data privacy and security regulations.

As one non-limiting example of a scenario where multiple rules data are used along a routing path, consider the use of a payment card. When a customer makes a purchase using their payment card, the transaction data is inserted into the financial institution's database. The insertion rule ensures that the transaction details meet specific criteria, such as valid cardholder information, transaction amount within acceptable limits, and correct transaction timestamp. Correlating rules may then verify the correlation between the transaction details and the customer's account information. For example, the correlating rule ensures that the cardholder's account exists, the transaction amount matches available credit, and the transaction location aligns with the customer's typical spending patterns. Once the transaction is verified, enriching rules may augment the transaction data with additional information. For instance, market data enrichment may add currency conversion rates to the transaction amount if the purchase is made in a foreign currency, or merchant category information to classify the transaction. The enriched transaction data may then undergo transformation rules to standardize and prepare it for reporting and analysis. This may involve converting currency values to a common currency, aggregating transactions by merchant category, and calculating metrics such as total spending or average transaction size. Finally, reconciliation rules compare the processed transaction data with external sources or other internal systems to ensure accuracy and consistency. Any discrepancies, such as missing transactions or mismatched amounts, may be identified and reconciled to maintain data integrity and compliance. Of course, numerous other examples are contemplated. Nonetheless, one can see many scenarios where a routing path of multiple rules, and thereby multiple processing modules, may be required for any give situation.

Indeed, numerous combinations and implementations of processing modules are contemplated, with each routing path specifying a corresponding processing module to be implemented, any other processing modules that may be included after said processing module, and so forth, for as many processing modules are necessary or desired by the user operating the system 130 through the interface of the endpoint device 140.

It shall be appreciated that there may be many different specific implementations of each of the foregoing describes types of rules. For example, there may be a specific enriching rule for payment transaction data, while there is another enriching rule for website traffic data, and so forth. The specific rule which is chosen and used in a given routing path is governed by the design of the routing path to meet the needs of the entity. As such, an enriching rule, or any other type of rule, that is implemented via a processing module pertaining to a routing path specific to a network event data having a given label may be different than an enriching rule, or any other type of rule, that is implemented for network event data having a different label.

As described previously, a processing module may contain a microservice to implement rule data corresponding to a rule in a rules data database. As such, the rule data, when amended in the rules data database, allows for any subsequent implementing of the corresponding rule data by the microservice engine to implement the amended corresponding rule data. Thus, when factors, variables, etc. in the rules data are changed, existing processing modules that were implementing such rule on network data stream(s) may now either (i) automatically begin implementing the amended rule by the microservice engine as a result of the amending of the rule data, (ii) begin implementing the amended rule on any newly implemented processing module (e.g., in a new routing path as to be defined by a user) by the microservice engine, or (iii) begin implementing the amended rule on any newly implemented processing module by the microservice engine while presenting on the interface of an endpoint device 140 a prompt as to whether to update those pre-existing processing modules that previously implemented the rule data.

By doing so, modifications or updates to rules data in the rules database are achieved at a centralized platform for rule management. This rules database allows authorized users to access the database to review, update, or add new rules as needed. The structured format of the rules data allows for easy identification and modification of specific rules without affecting others. By editing the attributes of a rule entry, such as conditions, actions, or dependencies, users can modify the behavior and outcomes governed by that rule. Additionally, the database may include version control mechanisms for the tracking of changes over time and version rollback.

At block 212, the system 130 transforms the network event data in accordance with the predetermined rule. In other words, if a processing module references an insertion rule, the network event data is transformed via the insertion rule. If the processing module references a correlating rule, the network event data is transformed via the correlating rule. If the processing module references an enriching rule, the network event data is transformed via the enriching rule. If the processing module references a transformation rule, the network event data is transformed via the transformation rule. If the processing module references a reconciliation rule, the network event data is transformed via the reconciliation rule. If the processing module references an API rule, the network event data is transformed via the API rule. Of course, other types of transformations defined by rules data not explicitly set forth herein are also considered.

In some circumstances, transforming the network event data in accordance with the predetermined rule may be unsuccessful. This may be due to various errors such as software bugs, corrupted data, hardware failures, faulty configurations, and so forth. In such instances, the network event data may be passed to a processing module, but subsequently not be transformed in accordance with the processing module. Accordingly, the queue of network event data may be growing prior to the processing module, since incoming network event data from the event stream(s) outpaces the rate at which it is able to be processed. Under such circumstances, the system 130 may be configured to re-route the network event data through the first processing module (or any processing module that is experiencing a failure in processing the network event data) a predetermined number of times, or until the network event data is successfully processed through the processing module(s).

For example, the system 130 may be configured to re-route the network event data five times through any given processing module (or sequence of processing modules) upon a condition where there the transformation of the network event data is unsuccessful. If still unsuccessful after the fifth attempt, the system 130 may remove the network event data from the queue, either by deleting the network event data or sequestering the network event data in a sequestration repository for further evaluation later.

Next, at block 214, once the network event data has been transformed by each of the processing modules as define by the reconfigured routing path, the system 130 routes, from a final processing module of the plurality of processing modules to an output module. The output module may also be determined (i.e., specified) by the preconfigured routing path. The purpose of the output module is to ultimately provide the network event data, after its transformation through the processing module(s) to various other systems and portions of the entity. For example, the transformed network event data may be sent downstream from the output module to an automated action for providing customized insurance quotes, or savings accounts, or investment options based specifically on the nature of the network event data, the source from which it is received, and so forth.

To better utilize the output from the processing modules, the network event data of the data stream may be converted at the output module into a format of a type different than that which was provided to the processing modules. For example, in instances where a format of a first type is provided to the input module, then converted to a second type for processing at the processing modules, the output module may either (i) convert the network event data of the data stream(s) back to the first type, (ii) keep the network event data of the data stream(s) as the second type, or (iii) convert the network event data of the data stream(s) to a third type. In instances where a format of a first type is provided to the input module and remains as the first type for processing at the processing modules, the output module may either (i) convert the network event data of the data stream(s) to a second type, or (ii) keep the network event data of the data stream(s) as the first type. As previously described, network event data of the first, second, and third types (i.e., formats) may be any combination of XML, AVRO, JSON, or the like.

FIG. 3 illustrates a graphical architectural representation of network event data streaming and processing via modular network event data architecture, in accordance with an implementation of the disclosure.

As shown in FIG. 3, the upstream even data 302 is received as a payload 304 by the input module 306. The input module 306 may be configured to receive data streams from multiple sources, identified as Source A and Source B in FIG. 3. The input module 306 may (i) convert the event data into another format, and/or (ii) send the event data to the processing modules 308 to transform the event data. As previously described, numerous rules data may be implemented by the processing module in various combinations, sequences, and characteristics in order to transform the event data into more valuable event data. Thus, processing modules 308 may include enrichment, correlation, stream source, API, reconciliation, transformation, and/or insertion rules, or the like, each of which is stored in a rules database 314. The specific processing modules will be selected based on a predetermined correlation between labels to be applied to each event data and the routing path(s) corresponding to the labels. To do so, lookup data 316 may be integrated as a repository to identify types of event data, routing paths, labels, correlation data between labels and routing path(s), etc. After the event data has been transformed at each of the relevant processing module(s) dictated by the routing path, an output module 310 may (i) convert the event data into another format, and/or (ii) send the event data downstream as downstream event data 312.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other implementations of the present disclosure set forth herein will come to mind to one skilled in the art to which these implementations pertain having the benefit of the teachings presented in the foregoing descriptions and the associated drawings. Although the Figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system for network event data streaming and processing via modular network event data architecture, the system comprising:

a processing device;

a non-transitory storage device containing instructions when executed by the processing device, causes the processing device to perform the steps of:

receiving, at an input module, at least one data stream, each data stream of the at least one data stream comprising a plurality of network event data in real-time;

determining, at the input module, a feature of at least one network event data of the plurality of network event data;

labeling, at the input module, the at least one network event data with a label corresponding with the feature;

retrieving, at the input module, a preconfigured routing path corresponding to the label from a path database, wherein the preconfigured routing path is configurable via a user interface by selecting the first processing module of the plurality of processing modules without writing computer code;

routing, from the input module to a first processing module of a plurality of processing modules determined by the preconfigured routing path, the at least one network event data, wherein the first processing module comprises a microservice engine to implement a predetermined rule based on corresponding rule data from a rules data database, wherein the first processing module is reusable for other preconfigured routing paths, wherein the corresponding rule data from the rules data database is amendable, wherein the microservice engine contains a pointer to the corresponding rule data in the rules data database such that the actual corresponding rule data is external to the first processing module, and wherein upon a condition where the corresponding rule data is amended, any subsequent implementing of the corresponding rule data by the microservice engine implements the amended corresponding rule data without disruption to existing network event data flow;

transforming the network event data in accordance with the predetermined rule, wherein the predetermined rule is selected from the group consisting of an insertion rule, a correlating rule, an enriching rule, a transformation rule, a reconciliation rule, and an API rule; and routing, from a final processing module of the plurality of processing modules to an output module, as determined by the preconfigured routing path.

2. The system of claim 1, wherein the preconfigured routing path arranges the plurality of processing modules in series with one another such that a module output from the first processing module provides a module input to a second processing module.

3. The system of claim 1, wherein receiving at least one data stream at an input module comprises receiving at least one data stream of a first type and converting from the first type to a second type, and wherein each of the plurality of processing modules is compatible with the second type.

4. The system of claim 1, wherein upon a condition where the at least one network event data is labeled as a priority event with a priority label corresponding with the feature, the first processing module transforms the priority event prior to transforming network event data of other data streams.

5. The system of claim 1, wherein upon a condition when transforming the network event data in accordance with the predetermined rule is unsuccessful, the network event data is rerouted through the first processing module a predetermined number of times.

6. A computer program product for network event data streaming and processing via modular network event data architecture, the computer program product comprising a non-transitory computer-readable medium comprising code causing an apparatus to:

receive, at an input module, at least one data stream, each data stream of the at least one data stream comprising a plurality of network event data in real-time;

determine, at the input module, a feature of at least one network event data of the plurality of network event data;

label, at the input module, the at least one network event data with a label corresponding with the feature;

retrieve, at the input module, a preconfigured routing path corresponding to the label from a path database, wherein the preconfigured routing path is configurable via a user interface by selecting the first processing module of the plurality of processing modules without writing computer code;

route, from the input module to a first processing module of a plurality of processing modules determined by the preconfigured routing path, the at least one network event data, wherein the first processing module comprises a microservice engine to implement a predetermined rule based on corresponding rule data from a rules data database, wherein the first processing module is reusable for other preconfigured routing paths, wherein the corresponding rule data from the rules data database is amendable, wherein the microservice engine contains a pointer to the corresponding rule data in the rules data database such that the actual corresponding rule data is external to the first processing module, and wherein upon a condition where the corresponding rule data is amended, any subsequent implementing of the corresponding rule data by the microservice engine implements the amended corresponding rule data without disruption to existing network event data flow;

transform the network event data in accordance with the predetermined rule, wherein the predetermined rule is selected from the group consisting of an insertion rule, a correlating rule, an enriching rule, a transformation rule, a reconciliation rule, and an API rule; and route, from a final processing module of the plurality of processing modules to an output module, as determined by the preconfigured routing path.

7. The computer program product of claim 6, wherein the preconfigured routing path arranges the plurality of processing modules in series with one another such that a module output from the first processing module provides a module input to a second processing module.

8. The computer program product of claim 6, wherein receiving at least one data stream at an input module comprises receiving at least one data stream of a first type and converting from the first type to a second type, and wherein each of the plurality of processing modules is compatible with the second type.

9. The computer program product of claim 6, wherein upon a condition where the at least one network event data is labeled as a priority event with a priority label corresponding with the feature, the first processing module transforms the priority event prior to transforming network event data of other data streams.

10. The computer program product of claim 6, wherein upon a condition when transforming the network event data in accordance with the predetermined rule is unsuccessful, the network event data is rerouted through the first processing module a predetermined number of times.

11. A method for network event data streaming and processing via modular network event data architecture, the method comprising:

receiving, at an input module, at least one data stream, each data stream of the at least one data stream comprising a plurality of network event data in real-time;

determining, at the input module, a feature of at least one network event data of the plurality of network event data;

labeling, at the input module, the at least one network event data with a label corresponding with the feature;

retrieving, at the input module, a preconfigured routing path corresponding to the label from a path database, wherein the preconfigured routing path is configurable via a user interface by selecting the first processing module of the plurality of processing modules without writing computer code;

routing, from the input module to a first processing module of a plurality of processing modules determined by the preconfigured routing path, the at least one network event data, wherein the first processing module comprises a microservice engine to implement a predetermined rule based on corresponding rule data from a rules data database, wherein the first processing module is reusable for other preconfigured routing paths, wherein the corresponding rule data from the rules data database is amendable, wherein the microservice engine contains a pointer to the corresponding rule data in the rules data database such that the actual corresponding rule data is external to the first processing module, and wherein upon a condition where the corresponding rule data is amended, any subsequent implementing of the corresponding rule data by the microservice engine implements the amended corresponding rule data without disruption to existing network event data flow;

transforming the network event data in accordance with the predetermined rule, wherein the predetermined rule is selected from the group consisting of an insertion rule, a correlating rule, an enriching rule, a transformation rule, a reconciliation rule, and an API rule; and routing, from a final processing module of the plurality of processing modules to an output module, as determined by the preconfigured routing path.

12. The method of claim 11, wherein the preconfigured routing path arranges the plurality of processing modules in series with one another such that a module output from the first processing module provides a module input to a second processing module.

13. The method of claim 11, wherein receiving at least one data stream at an input module comprises receiving at least one data stream of a first type and converting from the first type to a second type, and wherein each of the plurality of processing modules is compatible with the second type.

14. The method of claim 11, wherein upon a condition where the at least one network event data is labeled as a priority event with a priority label corresponding with the feature, the first processing module transforms the priority event prior to transforming network event data of other data streams.

15. The method of claim 11, wherein upon a condition when transforming the network event data in accordance with the predetermined rule is unsuccessful, the network event data is rerouted through the first processing module a predetermined number of times.

* * * * *